United States Patent
Felice et al.

[15] 3,637,412

[45] Jan. 25, 1972

[54] LADLE LINING REFRACTORY

[72] Inventors: Frank T. Felice, Chicago; Robert E. Fisher, Clarendon Hills; Louis J. Jacobs, Chicago, all of Ill.

[73] Assignee: Combustion Engineering, Inc., Windsor, Conn.

[22] Filed: Sept. 16, 1968

[21] Appl. No.: 760,094

[52] U.S. Cl. ............................... 117/26, 106/38.28, 106/56, 106/67, 117/5.3, 117/29, 117/33, 117/69, 117/70 A
[51] Int. Cl. .................. B44d 1/14, C04b 35/54, C04b 35/66
[58] Field of Search ..................... 117/5.1, 5.2, 5.3, 16, 26, 117/29, 33, 70, 100 I, 100 S, 123 A, 123 C; 106/38.28, 38.35, 56, 67; 252/25, 28, 30

[56] References Cited

UNITED STATES PATENTS

| | | | |
|---|---|---|---|
| 2,282,349 | 5/1942 | Wellings et al. | 117/5.2 |
| 2,426,988 | 9/1947 | Dean | 117/5.3 |
| 2,623,809 | 12/1952 | Myers | 106/56 |
| 2,626,871 | 1/1953 | Zinszer | 106/56 |
| 2,685,539 | 8/1954 | Woodburn et al. | 106/56 |
| 2,772,176 | 11/1956 | Leitten | 106/56 |
| 2,870,032 | 1/1959 | Jacobs | 106/67 |
| 3,023,114 | 2/1962 | Becker | 106/56 |
| 3,285,763 | 11/1966 | Jacobs | 106/67 |
| 3,303,031 | 2/1967 | Shields | 106/56 |

*Primary Examiner*—William D. Martin
*Assistant Examiner*—Raymond M. Speer
*Attorney*—Carlton F. Bryant, Arthur C. Firl, Eldon H. Luther, Robert L. Olson and John F. Carney

[57] ABSTRACT

A refractory material for lining metallurgical ladles and the method of producing the same are disclosed. The material comprises refractory aggregate particles such as calcined flint clay which are coated with various materials including an outer coating of graphite which is covered with an elastic film of material such as aluminum phosphate binder. The graphite gives the refractory mixture the desirable properties and the film protects the graphite from oxidation and wear. The material is prepared in apparatus such as a pelletizer with an inclined revolving disk whereby the separate particles are each coated to produce a final mixture of discrete particles which are flowable and thus easy to handle. The refractory may be used as a monolithic lining or it may be formed into brick.

15 Claims, No Drawings

LADLE LINING REFRACTORY

BACKGROUND OF THE INVENTION

The requirements for refractory linings of steel plant ladles presents a real problem because of the extreme severity of the environment and because failure usually results in contaminated steel and extra expense. The most important properties of a successful ladle refractory are as follows:
1. resistance to attack and reaction with molten slag;
2. resistance to attack by molten steel;
3. resistance to thermal shock which can cause premature failure and inclusions in the metal;
4. low thermal conductivity.

The holding time in ladles is normally relatively short resulting in rather steep temperature gradients across the refractory lining. This makes it impossible to establish any sort of equilibrium at all near the refractory-molten metal interface. For example, the temperature 1 inch from the interface in a 7½-inch thick ladle lining with an initial steel temperature of 2,880° F. is only about 500° after minutes and only reaches 1,200° after one hour.

Most steel is made with a basic slag and it would therefore seem logical that the ladle lining would also be basic. However, no basic refractory product was available having the necessary thermal shock resistance to withstand the sudden and extreme temperature cycling experienced with the loading and unloading of the ladle. Serious spalling and disintegration of the lining resulted with the use of such basic refractories under these conditions.

Because of the lack of a suitable basic refractory material, steelmakers have been forced to use acidic refractory materials such as fire clay brick. Even though the softening point of these brick materials is so low that their use would seem to be precluded in such environments, the short holding time and steep temperature gradient mentioned above make their use feasible. The use of brick, however, presents several disadvantages as compared to monolithic linings such as the need for special shapes and cutting. Another problem with brick is the sealing of the joints between bricks to prevent penetration of molten metal and slag.

SUMMARY OF THE INVENTION

An object of the present invention is to provide a ladle lining refractory material having properties compatible with the severe conditions encountered in ladle linings. Since the lining may be monolithic, the problem of sealing the joints between the bricks no longer exists and there is no joint erosion problem. The lining is also compatible with the basic slag. Furthermore, the material is ready to use, flowable, and easily transported into a form in the ladle and rammed into place. The composition primarily consists of refractory such as calcined flint clay coated with a binder such as aluminum phosphate, a bonding material such as a kaolinite bonding fireclay and graphite with a further top protective coating of binder.

DESCRIPTION OF THE PREFERRED EMBODIMENT

The ladle refractory material of the present invention employs a base of rather coarse, refractory aggregate which may be selected from materials such as calcined flint clay, alumina, zircon, silica, chrome ore and mullite. The first coating which is placed on the refractory aggregate is a binder material. The preferred binder for the present invention is aluminum phosphate or other phosphate binder such as phosphoric acid. After applying the binder, the particles are coated with selected materials such as bonding clays and kyanite or a similar material. The binder, bonding clay and kyanite constitute the matrix which surrounds and fills the voids between the refractory aggregate particles. A coating of graphite is then added followed by a further protective coating of binder. The graphite is highly refractory, prevents the sticking of the iron and slag to the lining, and is a prime contributor to the desirable properties of the mixture. The graphite, however, is readily oxidized at temperatures around 2,000° F. such as exist at the surface of the lining. This oxidation would destroy the characteristics of the lining attributable to the graphite such as the ability to prevent sticking. For this reason, the coating of binder is placed over the graphite. The binder also functions to provide strength to the refractory mixture from 150° F. up to the fusion point. Aluminum phosphate, for instance, is most elastic at elevated temperatures and provides a product with excellent spall and thermal shock resistance as well as strength.

The formulation of the ladle lining material of the present invention may vary depending on various factors such as the type and form of the particular ingredients used.

By way of example, the composition may be within the following ranges:

|  | Parts by Weight |
|---|---|
| Refractory Aggregate Particles | 40-95 |
| Kyanite | 0-20 |
| Graphite | 2-40 |
| Bonding Clay | 2-30 |
| Binder | 1-15 |
| Water | 1-15 |

A specific composition employing the preferred materials and exhibiting optimum properties is as follows:

|  | Parts by Weight |
|---|---|
| Calcined Flint Clay | 64.0 |
| Kyanite | 5.2 |
| Norwegian Graphite | 8.9 |
| Bond Fire Clay | 10.3 |
| Aluminum Phosphate | 6.5 |
| Water | 5.1 |

Calcined flint clay, which is the preferred refractory aggregate for the present invention, is manufactured from flint fireclay which is a hard or flintlike fireclay occurring as an unstratified massive rock, particularly devoid of natural plasticity and showing a conchodial fracture. This material is calcined to remove the shrinkage and then crushed to the desired particle size. A typical chemical analysis for calcined flint clay is as follows:

| Alumina | 44.37% |
|---|---|
| Silica | 51.89 |
| Titania | 2.67 |
| Ferric Oxide | 0.73 |
| Calcium Oxide | 0.05 |
| Magnesium Oxide | 0.11 |
| Alkalies | 0.38 |

The particle sizes of the refractory aggregate, although not a critical factor, lie generally between 3 and 100 mesh U.S. Standard Sieve size and with the larger portion being between 3 and 50 mesh. A typical size analysis of calcined flint clay for use in the invention is as follows:

| U.S. Std. Sieve | Percent Retained |
|---|---|
| 3 | 0.0 |
| 4 | 14.7 |
| 6 | 18.0 |
| 8 | 9.3 |
| 10 | 5.3 |
| 20 | 11.6 |
| 30 | 13.4 |
| 40 | 14.0 |
| 50 | 5.3 |
| 70 | 3.3 |
| 100 | 2.3 |
| Through 100 | 2.8 |

It will be noted that the above particle size distribution contains two distinct groupings, one containing relatively large particles and the other containing a concentration of finer particles. The intermediate size particles between these two groups are kept to a minimum. This particular combination of particle sizes is such that the large particles will bear against each other and the fine particles will fill the voids without actually wedging the large particles apart. Such an arrangement together with the proper proportioning of the amount of large and small particles will produce a final product of a high density which is necessary to resist penetration of the molten metal and slag into the refractory.

The kyanite, which is a desirable constituent of the mixture, is to provide a component which will expand in volume when heated above 2,000° F. This expansion takes place at about the same temperature that the bonding clay begins to shrink thus tending to fill any potential voids. Also, the kyanite reacts with the liquid phase which begins to occur at temperatures above 2,000° F. to form a more viscous glass. These factors all tend to improve the hot load bearing properties of the material. The kyanite also contributes to the refractoriness of the matrix which has the lowest melting temperature of the ingredients in the final product. Other natural silicate of aluminum refractory materials which expand upon heating could be substituted for the kyanite, such as andalusite and sillimanite, although these materials do not expand as much as kyanite and thus are not as desirable.

The kyanite is preferably crushed raw Virginia kyanite, which is an aluminum sillicate mineral having the following approximate chemical composition:

| | |
|---|---|
| Alumina | 56.3 |
| Silica | 41.5 |
| Titania | 1.2 |
| Ferric Oxide | 0.8 |
| Calcium Oxide | 0.1 |
| Magnesium Oxide | 0.1 |

A suitable particle size analysis for the kyanite is as follows:

| U.S. Std. Sieve | Percent Retained |
|---|---|
| 20 | 0.0 |
| 30 | 0.1 |
| 40 | 7.8 |
| 50 | 15.7 |
| 70 | 31.1 |
| 100 | 22.2 |
| 140 | 10.7 |
| 200 | 6.6 |
| 270 | 3.9 |
| Through 270 | 1.9 |

The term "bonding material" as used herein is intended to include those materials which have a strong bonding power and the ability to bond the other nonplastic constituents together. The bonding materials may be selected from materials such as the bonding clays and methyl cellulose. The term "bonding clay" as used herein is intended to include the broad group of clay materials which exhibit this bonding power. The most common group of bonding clays are the plastic or bond fireclays. Other examples include bentonite and plastic kaolinite-containing materials such as kaolin.

A preferred bond clay is a plastic kaolinite-type fireclay which has the following typical chemical analysis:

| | |
|---|---|
| Alumina | 41.57 |
| Silica | 53.96 |
| Titania | 2.15 |
| Ferric Oxide | 1.38 |
| Calcium Oxide | 0.09 |
| Magnesium Oxide | 0.17 |
| Alkalies | 0.64 |

This bond clay is prepared by drying and then grinding to pass a 12 mesh sieve. Kaolin may be substituted for the less pure kaolinite-containing fireclays if a more refractory bonding material is required. The methyl cellulose bonding material is particularly desirable when zircon or zirconia is used as the base refractory aggregate in which case additional amounts of finely ground zircon or zirconia would be added. The function of the bonding clay or bonding material in the mixture is to fill the voids between the refractory aggregate particles and to provide plasticity and adhesiveness to the refractory mixture. The bonding clay provides the bond for holding the aggregate together at the elevated temperatures.

The preferred graphite for use in the invention is Norwegian graphite, which is a natural material found in Norway. The graphite-bearing ore is crushed and the graphite separated from the gangue by flotation, dried and sized as follows:

| U.S. Std. Sieve | Percent Retained |
|---|---|
| 20 | 0.0 |
| 30 | 0.1 |
| 40 | 0.6 |
| 50 | 5.0 |
| 70 | 13.6 |
| 100 | 21.2 |
| 140 | 21.6 |
| 200 | 17.4 |
| 270 | 5.0 |
| Through 270 | 15.2 |

The carbon content of the resultant material is approximately 90 percent. This particular Norwegian graphite is preferred because of the large flake structure and because it is relatively soft and resistant to oxidation in contrast to graphites from other locations.

The coating of the refractory aggregate with the various materials is carried out in a manner such that the particles do not adhere to each other and form a sticky mass rather than the desired discrete, flowable particles. This is accomplished by employing a pelletizing apparatus which is preferably of the type comprising an inclined, revolving disk. Such apparatus is marketed, for example by Dravo Corporation under the designation "Dravo-Lurgi" pelletizing disk. Pellet size in such apparatus can be selected and controlled such as by controlling the rotation speed, the angle of tilt and the location of feed. The inherent size classification action of the disk stratifies the particles on the bottom of the pan and continuously discharges the finished pellets within a very narrow size range. The disks also permit the operator to view the materials during processing. These pelletizing disks require little maintenance and still produce at high through-put rates.

The mixture is prepared by first weighing the calcined flint clay or other refractory aggregate and conveying it to the surface of the tilted disk of the pelletizing apparatus which is revolved at a speed of approximately 18 r.p.m. at an angle of 45°. An aqueous slurry is formed from the aluminum phosphate or other binder and a portion is sprayed on the refractory aggregate rolling on the turning disk. The bond clay is then introduced onto the revolving disk and the clay adheres to the coating of binder already on the refractory aggregate particles. The kyanite and graphite are then coated on the particles in a similar manner. The balance of the aluminum phosphate-water slurry is then sprayed onto the particles on the disk to form the top protective coating over the graphite. After a short period of tumbling on the disk, perhaps about 3 minutes, the material, which is nonagglomerated and still in discrete particles, is discharged from the disk, conveyed to a packer and packed in multiwalled polyethylene lined bags or cartons. Following are some typical properties of the resultant refractory material:

| Chemical Analysis | | | |
|---|---|---|---|
| | As Received | Dried | Calcined |
| Alumina | 36.27 | 38.50 | 43.16 |
| Silica | 41.96 | 44.49 | 49.87 |
| Ferric Oxide | 0.69 | 0.73 | 0.82 |
| Titania | 1.98 | 2.10 | 2.36 |
| Calcium Oxide | 0.07 | 0.08 | 0.09 |
| Magnesium Oxide | 0.09 | 0.10 | 0.11 |
| Alkalies | 0.34 | 0.36 | 0.40 |
| Loss on Ignition | 13.80 | 13.64 | — |
| Moisture | 5.80 | — | — |

| Physical Properties | | |
|---|---|---|
| Test Temperature | % Linear Change | Modulus of Rupture Room Temperature | Modulus of Rupture at Temperature |
| 230° F. | −0.2 | 590 p.s.i. | — |
| 1000 | −0.2 | 550 | — |
| 1500 | −0.2 | 300 | 340 p.s.i. |
| 2000 | −0.3 | 300 | 485 |
| 2300 | −0.2 | 350 | 108 |

| | | | |
|---|---|---|---|
| 2500 | +0.6 | 380 | 56 |
| 2700 | +0.8 | 370 | 34 |
| 2912 | +1.0 | 400 | — |
| 3000 | +1.2 | 810 | — |

The angle of contact between the molten slag and molten metal and the graphite-coated refractory particles is high which prevents the wetting and capillary penetration of the lining by the molten metal. This results in a low rate of chemical attack on the refractory lining. The thermal conductivity of the lining is low and the molten metal does not readily solidify and form a skull in the ladle because of the nonwettability of the refractory. The refractory has the ability to withstand thermal shock without spalling and it has high strength throughout the usable temperature range so as to resist the impact of the molten metal stream when it first enters the empty ladle. The refractory also exhibits low shrinkage. One of the most unique features of the ladle lining refractory of this invention is its flowable consistency and the fact that it is in the form of discrete particles which, when removed from the package, can be easily conveyed to a form in the ladle such as on a vibrating conveyor. The refractory is then rammed into place to conform to the contour of the ladle and to form a dense, nonporous lining. No special shapes are required nor is any cutting necessary such as with brick linings. Of course, the material may also be used to form bricks by forming the required shapes and drying at a temperature of about 260° C.

The particular ingredients and method of manufacture of the refractory permits the incorporation of graphite with an elastic protective coating so as to prevent or retard the oxidation of the graphite. The process of wear and abrasion of the lining material is also comparatively slow. The refractory dries readily and it does not crack or blister on drying. The modulus of ruptfrom re under various conditions is also high, as previously noted, resulting in resistance to erosion at the operating temperatures.

While specific examples of the ladle lining refractory material of the present invention have been given, it will be realized that certain changes may be made within the scope of the invention as set forth in the following claims.

We claim:

1. A method of producing a refractory composition of nonagglomerated, discrete particles for monolithic refractory construction comprising the steps of:
   a. providing a quantity of relatively coarse, discrete, refractory aggregate particles;
   b. coating said discrete particles with a quantity of a phosphate binder;
   c. mixing a quantity of relatively fine bonding clay with the coated discrete particles from step (b) to coat said bonding clay thereon;
   d. mixing a quantity of graphite flakes with the coated discrete particles from step (c) to coat said graphite thereon;
   e. adding an additional quantity of a phosphate binder to the coated discrete particles 1step (d) to form a top protective coating of said binder over said graphite to produce said nonagglomerated refractory composition.

2. A method as recited in claim 1 and further including the step of adding a quantity of silicate of aluminum selected from the group consisting of kyanite, andalusite and sillimanite to said discrete particles subsequent to step (b) and prior to step (d).

3. A method as recited in claim 2 wherein said phosphate binder is mixed with water prior to coating.

4. A method as recited in claim 3 wherein said quantities comprise from 40–95 parts by weight refractory aggregate, 1–15 parts by weight phosphate binder, 1–15 parts by weight water, 2–30 parts by weight graphite and up to 20 parts by weight of said silicate of aluminum.

5. The method as recited in claim 4 wherein said refractory aggregate particles are selected from the group consisting of calcined flint clay, alumina, zircon, silica, chrome ore, and mullite; said bonding clay is selected from the group consisting of bond fireclay, kaolin and bentonite; and said phosphate binder is selected from the group consisting of aluminum phosphate and phosphoric acid.

6. A method of producing a refractory composition of nonagglomerated, discrete particles for monolithic construction comprising the steps of:
   a. providing discrete calcined flint clay particles having a particle size primarily between 3 and 100 mesh;
   b. spraying a slurry of aluminum phosphate and water on said discrete flint clay particles to coat said particles therewith;
   c. mixing a bond clay selected from the group consisting of bond fireclay and kaolin with the discrete particles from step (b) to coat said particles therewith, said bond clay having been sized to pass through a 12 mesh screen;
   d. mixing graphite with the discrete particles from step (c), said graphite having a particle size primarily less than 50 mesh; and
   e. adding additional aluminum phosphate and water slurry to the discrete particles from step (d) to produce said nonagglomerated refractory composition.

7. A method as recited in claim 6 wherein said refractory composition comprises about 64.0 percent calcined flint clay, 6.5 percent aluminum phosphate, 5.1 percent water, 10.3 percent bonding clay, and 8.9 percent graphite and further including 5.2 percent of silicate of aluminum selected from the group consisting of kyanite, andalusite and sillimanite, said silicate of aluminum being added to said discrete particles subsequent to step (b) and prior to step (d).

8. A refractory composition consisting essentially of a base of refractory aggregate particles, a coating on said particles of a phosphate binder, a coating of bonding clay over said phosphate binder coating, a coating of graphite over said bonding clay, and a further coating of phosphate binder over said graphite coating.

9. A refractory composition as recited in claim 8 and further including a quantity of silicate of aluminum applied to said particles prior to the coating of graphite thereon.

10. A refractory composition as recited in claim 9 and further including a quantity of water mixed with said phosphate binder prior to coating said particles therewith.

11. A refractory composition as recited in claim 10 wherein said composition contains about 40–95 parts by weight refractory-aggregate, 1–15 parts by weight phosphate binder, 1–15 parts by weight water, 2–30 parts by weight bonding clay, 2–40 parts by weight graphite and up to 20 parts by weight of said silicate of aluminum.

12. A refractory composition consisting essentially of calcined flint clay particles, a coating of aluminum phosphate on said particles, a coating of bonding clay over said aluminum phosphate coating, a coating of graphite over said coating of bonding clay, and a coating of aluminum phosphate over said graphite coating.

13. A refractory composition as recited in claim 12 and further including a quantity of kyanite applied to said particles prior to the coating of graphite thereon.

14. A refractory composition as recited in claim 13 and further including a quantity of water mixed therewith wherein said composition contains about 40–95 parts by weight calcined flint clay, 1–15 parts by weight aluminum phosphate, 1–15 parts by weight water, 2–30 parts by weight bonding clay, 2–40 parts by weight graphite and up to 20 parts by weight kyanite.

15. A refractory composition as recited in claim 13 and further including a quantity of water mixed therewith wherein said composition contains about 64.0 percent calcined flint clay, 6.5 percent aluminum phosphate 5.1 percent water, 10.3 percent bonding clay, 5.2 percent kyanite and 8.9 percent graphite.

* * * * *

PO-1050
(5/69)

UNITED STATES PATENT OFFICE
CERTIFICATE OF CORRECTION

Patent No. 3,637,412            Dated January 25, 1972

Inventor(s) Frank T. Felice et al

It is certified that error appears in the above-identified patent and that said Letters Patent are hereby corrected as shown below:

| | |
|---|---|
| Column 5, line 33 | following "of" delete "ruptfrom re" and insert --rupture-- therefor. |
| Column 5, line 54 | following "particles" delete "1" and insert --from-- therefor. |
| Column 6, lines 44-45 | for "refrac-tory-aggregate", read --refrac-tory aggregate--. |
| Column 6, line 68 | following "phosphate" insert --,--. |

Signed and sealed this 23rd day of January 1973.

(SEAL)
Attest:

EDWARD M. FLETCHER, JR.
Attesting Officer

ROBERT GOTTSCHALK
Commissioner of Patents